US00RE50502E

(19) United States
(12) Reissued Patent
Cheng et al.

(10) Patent Number: US RE50,502 E
(45) Date of Reissued Patent: Jul. 22, 2025

(54) APPARATUS FOR TERMINATING WIRES

(71) Applicant: CommScope Telecommunications (Shanghai) Co. Ltd., Shanghai (CN)

(72) Inventors: Jun Cheng, Shanghai (CN); Yuanzhe Zhang, Shanghai (CN); Xindong Zhu, Shanghai (CN); Dongdong Qian, Shanghai (CN); Lei Chen, Shanghai (CN)

(73) Assignee: CommScope Telecommunications (Shanghai) Co. Ltd., Shanghai (CN)

(21) Appl. No.: 17/742,856

(22) Filed: May 12, 2022

Related U.S. Patent Documents

Reissue of:
(64) Patent No.: 11,108,204
Issued: Aug. 31, 2021
Appl. No.: 16/577,456
Filed: Sep. 20, 2019

U.S. Applications:
(63) Continuation of application No. 15/030,337, filed as application No. PCT/IB2014/065463 on Oct. 20, 2014, now Pat. No. 10,439,352.

(30) Foreign Application Priority Data

Oct. 18, 2013 (CN) ..... 201310492238.6

(51) Int. Cl.
*H01R 43/042* (2006.01)
*H01R 4/2433* (2018.01)
(Continued)

(52) U.S. Cl.
CPC ..... *H01R 43/0425* (2013.01); *H01R 4/2433* (2013.01); *H01R 24/64* (2013.01); *H01R 43/015* (2013.01); *H01R 43/048* (2013.01)

(58) Field of Classification Search
CPC .. H01R 43/0425; H01R 4/2433; H01R 24/64; H01R 43/015; H01R 43/048;
(Continued)

(56) References Cited

U.S. PATENT DOCUMENTS 5,521,997 A * 5/1996 Rovenolt ..... G02B 6/3831 385/75
5,664,963 A 9/1997 Yamamoto et al.
(Continued)

FOREIGN PATENT DOCUMENTS

CN 1599153 A 6/2004
CN 2624479 Y 7/2004
(Continued)

OTHER PUBLICATIONS

International Search Report for International Application No. PCT/IB2014/065463 mailed Jan. 22, 2015 (3 pages).

*Primary Examiner* — Terrence R Till
(74) *Attorney, Agent, or Firm* — Merchant & Gould P.C.

(57) ABSTRACT

A terminating apparatus for terminating a plurality of wires of a cable to a plurality of connection terminations of a communication module, the communication module comprises at least one upright walls each provided with at least one receiving slots for receiving the connection terminations each of which is electrically connected with one wire. The terminating apparatus comprises: at least one terminating portion into which the upright walls of the communication module are able to be inserted, each terminating portion separately holding the plurality of wires of the cable; and at least one cutting apparatus mounted in the terminating portions outside the receiving slot of the communication module and constructed to cut off parts of the wires which extend out the receiving slots after the wires are terminated to the connection terminations of the communication module. The wires may be easily and quickly terminated to the communication module. External protection layers of the wires are pierced and conductors of the wires are electrically connected to the communication module during terminating the wires. It does not need to peel off the external protection layers of the wires before terminating the wires.

9 Claims, 11 Drawing Sheets

(51) Int. Cl.
*H01R 24/64* (2011.01)
*H01R 43/01* (2006.01)
*H01R 43/048* (2006.01)

(58) Field of Classification Search
CPC .. H01R 4/2404; H01R 4/2407; H01R 4/2412; H01R 24/62; H01R 24/60; H01R 43/01
See application file for complete search history.

(56) References Cited

U.S. PATENT DOCUMENTS 6,872,090 B2 3/2005 De Dios Martin
7,103,968 B2 9/2006 Karrasch
7,466,891 B2 * 12/2008 Wagner ..... G02B 6/3802 385/134
7,720,345 B2 * 5/2010 Katagiyama ..... G02B 6/3898 385/137
7,766,688 B2 8/2010 Mateo Ferrus et al.
8,152,384 B2 * 4/2012 de Jong ..... G02B 6/3893 385/53
8,215,980 B1 * 7/2012 Lin ..... H01R 4/2433 439/404
8,297,850 B2 * 10/2012 Nishioka ..... G02B 6/3829 385/60
8,333,607 B1 * 12/2012 Moldoch ..... H01R 4/2433 439/367
8,418,347 B2 4/2013 Chen et al.
10,439,352 B2 * 10/2019 Cheng ..... H01R 43/048
2003/0051337 A1 3/2003 Holliday
2003/0129872 A1 7/2003 Tolmie
2004/0137784 A1 * 7/2004 Martin ..... H01R 4/2433 439/417
2005/0085120 A1 4/2005 Carroll
2005/0287862 A1 12/2005 Castaldo
2006/0093300 A1 * 5/2006 Marrs ..... G02B 6/3846 385/134
2007/0141892 A1 6/2007 Gula
2007/0254529 A1 * 11/2007 Pepe ..... H01R 13/6464 439/676
2010/0064502 A1 3/2010 Chen
2011/0028026 A1 * 2/2011 Lu ..... H01R 24/64 439/404

FOREIGN PATENT DOCUMENTS

CN 101060219 A 10/2007
CN 101783474 A 7/2010
CN 203166115 U 8/2013
CN 203536711 U 10/2013
EP 1 422 793 * 4/2004 ..... H01R 43/01
EP 1 422 793 A1 5/2004
EP 1 484 824 A2 12/2004
WO WO-2005064755 A1 * 7/2005 ..... H01R 13/6466
WO 2008/059203 A2 5/2008
WO WO-2010130574 A1 * 11/2010 ..... H01R 13/6588

* cited by examiner

APPARATUS FOR TERMINATING WIRES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application is a Continuation of U.S. patent application Ser. No. 15/030,337, filed on Apr. 18, 2016, now U.S. Pat. No. 10,439,352; which is a National Stage of PCT/M2014/065463, filed Oct. 20, 2014; a which claims the benefit of Chinese Patent Application No. 201310492238.6 filed on Oct. 18, 2013 in the State Intellectual Property Office of China; which applications are incorporated herein by reference in their entirety. To the extent appropriate, a claim of priority is made to each of the above disclosed applications.

BACKGROUND OF THE INVENTION

Field of the Invention

The present invention relates to a method for terminating wires of a cable to a communication module, more particularly, relates to a terminating apparatus, a pressing tool and a tool kit for terminating wires to a communication module as well as a method for terminating wires of a cable to a communication module by means of the terminating apparatus and the pressing tool.

Description of the Related Art

In various network communication terminals, such as, computer, router, server, exchange, etc., a user terminal is electrically connected to an external cable, generally, by inserting a plug connector into a communication module, for example, a receptacle connector mounted in a wall.

FIGS. 13 and 14 show an illustrative view of a typical communication module. The communication module may be a receptacle connector for network connection mounted in room. In this case, a mating plug connector may be electrically connected to the receptacle connector to achieve a signal connection. The communication module comprises eight mating contacts 201. Before mounting the communication module on an installation device, such as, a wall, a bracket, etc., it needs to electrically connect wires 301 of a cable 300 to connection terminations 205 of the communication module 200, respectively. The connection terminations 205 are partly exposed from a backside of a body 202 of the communication module 200, and electrically connected to the mating contacts 201, respectively, in the body 202.

In prior art, a method for terminating the wires 301 of the cable 300 to the communication module generally comprises steps of: firstly, preassembling a special terminating tool to the communication module; then, placing the communication module in a horizontal direction; and cutting end portions of the wires by a special cutting tool. The special terminating tool and the special cutting tool in the prior art are very complicated and expensive. Furthermore, in the prior art, after terminating the wires to the communication module, it is very difficult to take out the cable.

SUMMARY OF THE INVENTION

The present invention has been made to overcome or alleviate at least one aspect of the above mentioned disadvantages.

According to an object of the present invention, there is provided a terminating apparatus, a pressing tool, a tool kit as well as a method for terminating wires to a communication module, wherein the wires may be easily and quickly terminated to the communication module.

According to another object of the present invention, there is provided a terminating apparatus, a pressing tool, a tool kit as well as a method for terminating wires to a communication module, wherein external protection layers of the wires are pierced and conductors of the wires are electrically connected to the communication module during terminating the wires, therefore, it does not need to peel off the external protection layers of the wires before terminating the wires.

According to an aspect of the present invention, there is provided a terminating apparatus for terminating a plurality of wires of a cable to a plurality of connection terminations of a communication module, the communication module comprising at least one upright walls each provided with at least one receiving slots for receiving the connection terminations each of which is electrically connected with one wire. The terminating apparatus comprises: at least one terminating portion into which the upright walls of the communication module are able to be inserted, each terminating portion being constructed to separately hold the plurality of wires of the cable; and at least one cutting apparatus mounted in the terminating portions outside the receiving slot of the communication module and constructed to cut off parts of the wires which extend out the receiving slots after the wires are terminated to the connection terminations of the communication module.

According to an exemplary embodiment of the present invention, the communication module comprises a pair of upright walls arranged parallel to each other in a first direction, the receiving slots being formed in the upright walls in a second direction perpendicular to the first direction. The terminating apparatus further comprises: a pair of terminating portions arranged parallel to each other in the first direction, the plurality of wires extending parallel to each other in the second direction; and a connection portion, in which the cable is adapted to be held, provided between the pair of terminating portions.

According to another exemplary embodiment of the present invention, an arc portion extending in a third direction perpendicular to the first and second directions is formed on the connection portion, so as to hold the cable extending in the third direction.

According to another exemplary embodiment of the present invention, each of the terminating portions comprises: a first support wall connected to the connection portion; a second support wall provided parallel to the first support wall; and a plurality of separation walls provided between the first support wall and the second support wall. The cable is adapted to be held between opposite first support walls. Each of the separation walls is adapted to be inserted into the respective receiving slot of the upright wall. The cutting apparatus is provided between the second support wall and the plurality of separation walls.

According to another exemplary embodiment of the present invention, a plurality of first holding slots are formed in a first edge of the first support wall, and each of the first holding slots is aligned with a respective separation wall in the second direction.

According to another exemplary embodiment of the present invention, a plurality of second holding slots are formed in a first edge of the second support wall, each of the second holding slots is aligned with a respective separation wall in the second direction.

According to another exemplary embodiment of the present invention, each of the separation walls is provided with a notch between the cutting apparatus and the first support wall.

According to another exemplary embodiment of the present invention, the cutting apparatus comprises a blade extending in the first direction, and the blade of the cutting apparatus exceeds the separation walls in the third direction by a height no less than a diameter of the wire.

According to another exemplary embodiment of the present invention, the terminating portion further comprises a base for supporting the first support wall, the second support wall and the separation walls.

According to another aspect of the present invention, there is provided a pressing tool for terminating the wires of the cable, which are placed in the terminating apparatus according to any one of the above embodiments, to the communication module, comprising: a seat having a blocking portion formed on a first end thereof; a handle pivotally mounted on a second end of the seat opposite to the first end; a movable block; and a link both ends of which pivotally connected to the handle and the movable block, respectively, so that the movable block is moved on the seat once the handle is rotated relative to the seat.

According to an exemplary embodiment of the present invention, the movable block is configured to be moved between an initial position where the terminating apparatus and the communication module preassembled into an initial engagement state are adapted to be placed between the movable block and the blocking portion and a final position where the terminating apparatus and the communication module are adapted to be pressed into a final engagement state, in which the wires are electrically connected to the connection terminations, respectively, by moving the movable block relative to the blocking portion.

According to another exemplary embodiment of the present invention, the movable block is engaged to the seat via a guide rail mechanism.

According to another exemplary embodiment of the present invention, the movable block is formed with a guide protrusion thereon, and the seat is formed with a guide slot mated with the guide protrusion.

According to another exemplary embodiment of the present invention, the blocking portion is formed with a recess for receiving the arc portion of the terminating apparatus.

According to another exemplary embodiment of the present invention, the seat is formed by assembling two substantially identical half bodies.

According to another aspect of the present invention, there is provided a tool kit for terminating the wires of the cable to the communication module, comprising: the terminating apparatus according to any one of the above embodiments; and the pressing tool according to any one of the above embodiments.

According to another aspect of the present invention, there is provided a method for terminating the wires to the communication module with the tool kit according to the above embodiment, comprising steps of:

S100: removing an external sheath from an end of the cable to expose the plurality of wires;

S200: passing the cable through between a pair of terminating portions, and holding the plurality of wires on the terminating portions and parallel to each other in a second direction;

S300: initially engaging the communication module to the terminating apparatus, so that the upright wall of the communication module partly inserted into the terminating portion of the terminating apparatus;

S400: opening the handle of the pressing tool, and placing the terminating apparatus and the communication module being in an initial engagement state between the movable block and the blocking portion on the pressing tool;

S500: pressing the handle, so that the movable block is moved toward the blocking portion, the respective wire is driven by the respective separation wall of the terminating apparatus to move toward a piercing portion of the respective connection termination, and the piercing portion pierces an external protection layer of the respective wire;

S600: continuing pressing the handle until a conductor of the pierced wire is moved into and becomes electrical contact with a holding portion of the respective connection termination under the driving of the respective separation wall of the terminating apparatus;

S700: opening the handle, and taking the terminating apparatus and the communication module being in the final engagement state away from the pressing tool; and

S800: removing the terminating apparatus from the communication module.

According to an exemplary embodiment of the present invention, in the step S200, the wires are pressed into the first holding slots of the first support wall and the second holding slots of the second support wall, rested on the separation walls, and cross over the cutting apparatus.

According to another exemplary embodiment of the present invention, in the step S600, the cutting apparatus cut off end portions of the wires which extend out the receiving slots of the communication module.

According to another exemplary embodiment of the present invention, in the step S400, the arc portion of the terminating apparatus is received in a recess of the blocking portion.

In the terminating apparatus, the pressing tool, the tool kit as well as the method for terminating wires to a communication module according to the above various exemplary embodiments, terminating the wires of the cable to the communication module may be done by a single operation. The communication module may be easily and quickly mounted to or removed from the terminating apparatus, saving the operation time and increasing the work efficiency. In addition, a special cutting tool for peeling off the external protection layers of the wires before terminating the wires is not necessary in the present invention, saving the cost. Furthermore, the wires of the cable may be reliably and stably terminated to the communication module, improving the reliability of the network wiring.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
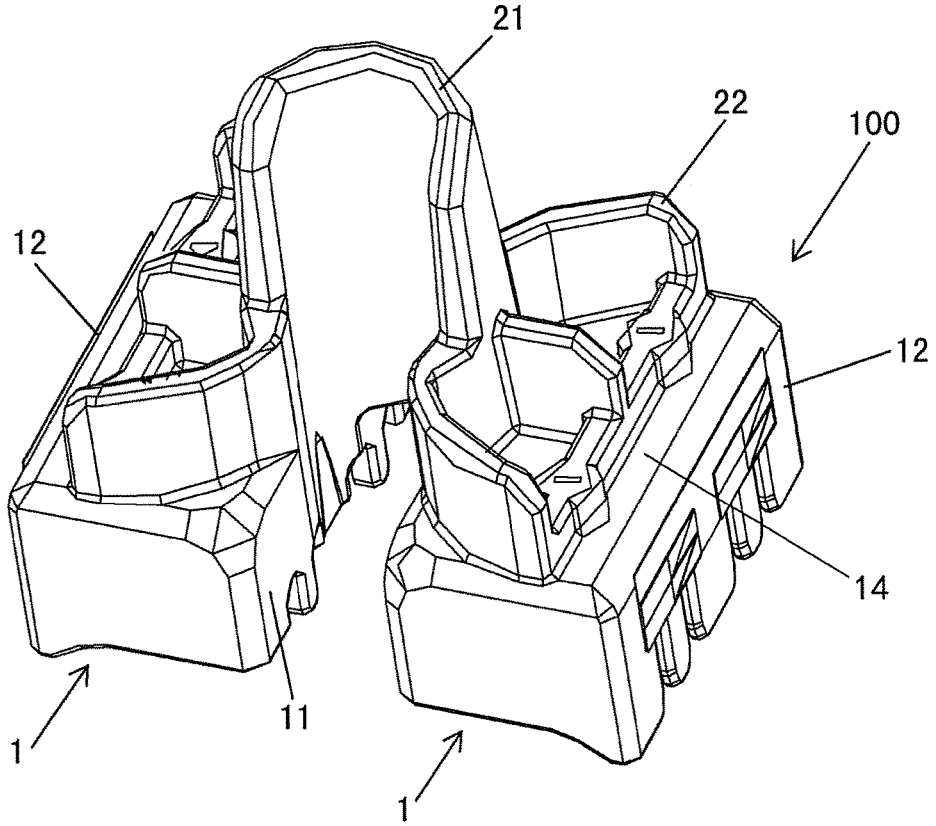
FIG. 1 is an illustrative perspective view of a terminating apparatus according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present invention, there is provided a terminating apparatus for terminating a plurality of wires of a cable to a plurality of connection terminations of a communication module, the communication module comprises at least one upright walls each provided with at least one receiving slots for receiving the connection terminations each of which is electrically connected with one wire. The terminating apparatus comprising: at least one terminating portion into which the upright walls of the communication module are able to be inserted, each terminating portion being constructed to separately hold the plurality of wires of the cable; and at least one cutting apparatus mounted in the terminating portions outside the receiving slot of the communication module and constructed to cut off parts of the wires which extend out the receiving slots after the wires are terminated to the connection terminations of the communication module.

Firstly, it will describe a typical communication module according to embodiments of the present invention with reference to FIGS. 13-19. The communication module may be used in various network communication terminals, such as, computer, router, server, exchange, etc. Generally, a user terminal is electrically connected to an external cable by inserting a plug connector into the communication module, for example, a receptacle connector mounted in a wall.

FIGS. 13-19 show a typical communication module. The communication module 200 may be a receptacle connector for network connection mounted on an installation device, such as, a wall, a bracket, etc. In this case, a mating plug connector may be electrically connected to the receptacle connector to achieve a signal connection. The communication module comprises a body 202, a support portion perpendicularly mounted to a front end of the body 202, eight mating contacts 201 mounted on the support portion, and a housing mounted on the body and adapted to receive the support portion and the mating contacts. A mating communication module (not shown), such as, a plug connector, may be inserted into the housing to electrically connect the communication module 200.

Figure 15:
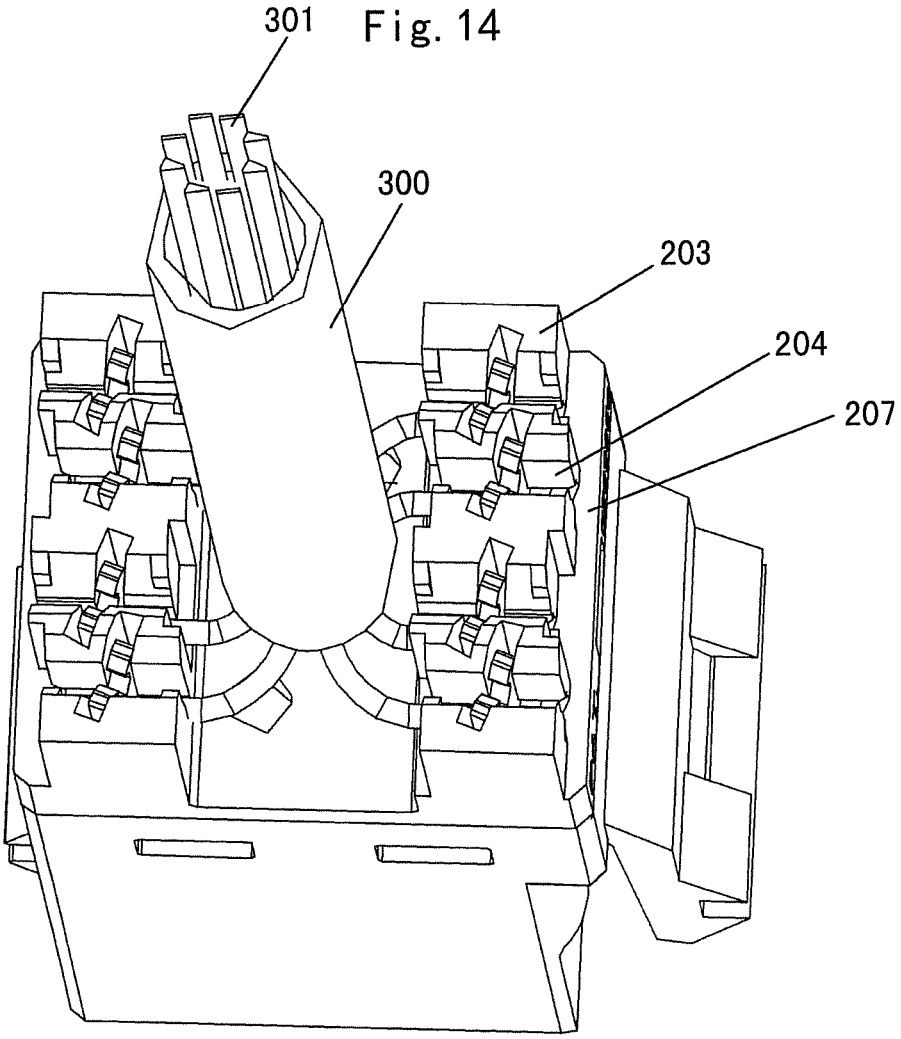
FIG. 15 is another illustrative perspective view of the communication module of FIG. 13.
Figure 16:
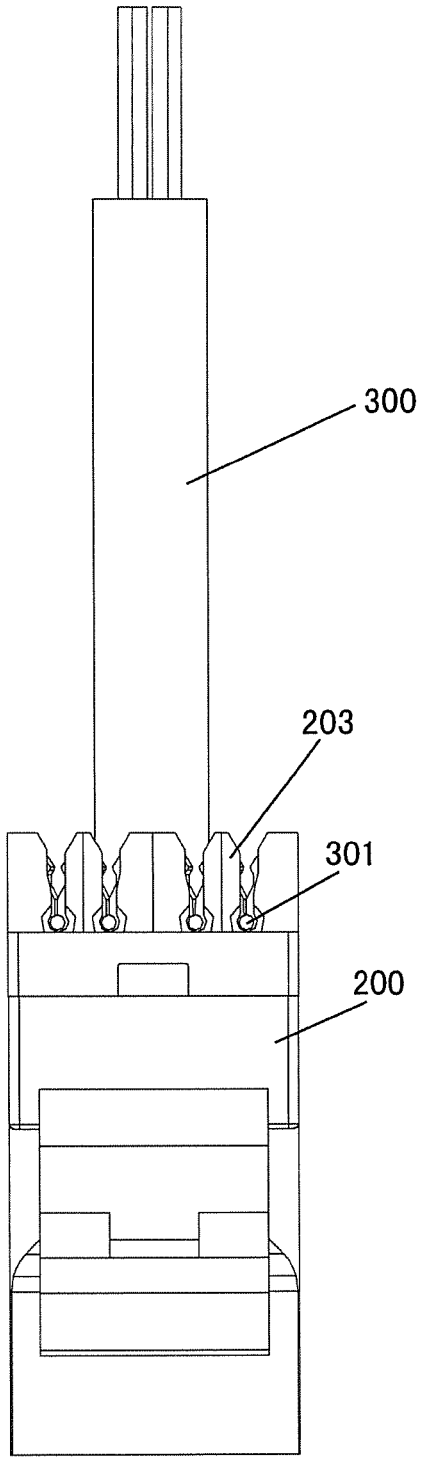
FIG. 16 is an illustrative side view of the communication module of FIG. 13.
Figure 17:
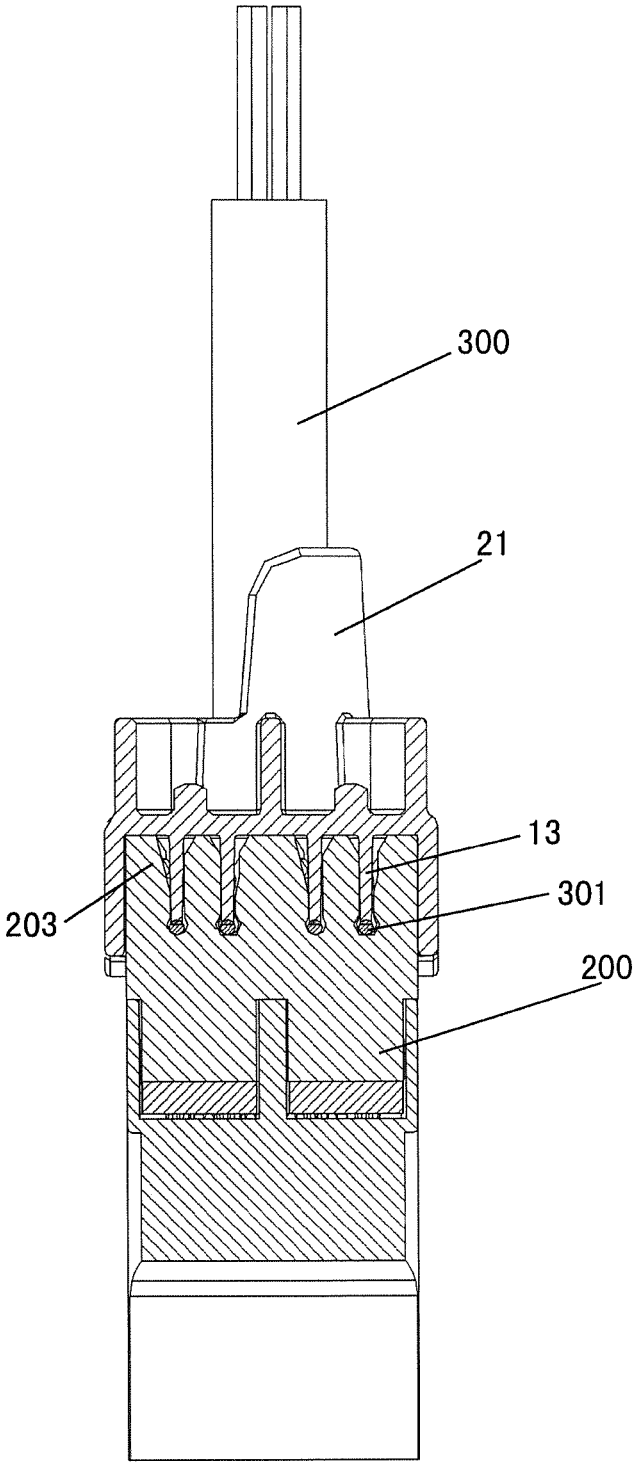
FIG. 17 is an illustrative local cross section view of the communication module and the terminating apparatus being in the final engagement state shown in FIG. 10.
Figure 18:
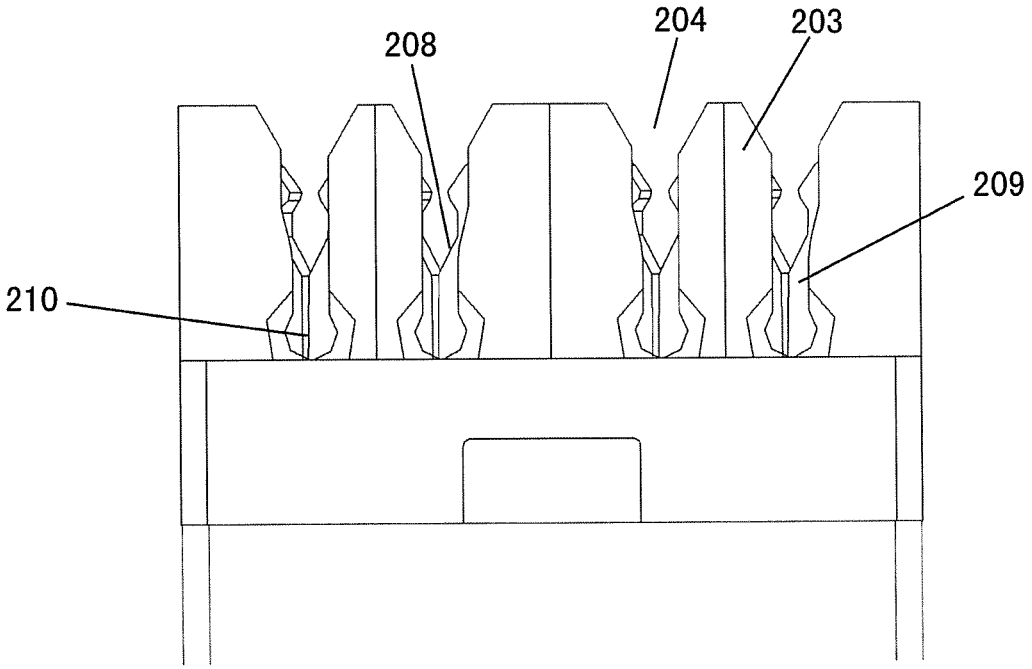
FIG. 18 is an illustrative local enlarged cross section view of the communication module shown in FIG. 16.
Figure 19:
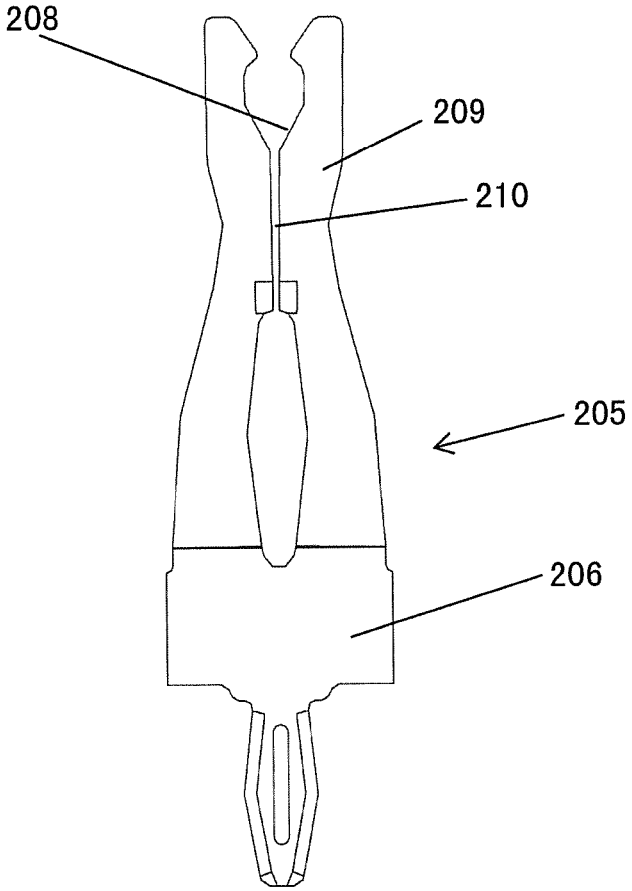
FIG. 19 is an illustrative side view of a connection termination mounted in the communication module.

As shown in FIG. 15, the communication module 200 further comprises a pair of upright walls 203 and a plurality of connection terminations 205 (eight connection terminations are shown). The upright walls 203 are located at a rear end of the body 202 and arranged in parallel to each other in a first direction (a longitudinal direction). Each of the upright walls 203 is provided with a plurality of receiving slots 204 extending in a second direction (a lateral direction) perpendicular to the first direction. The connection terminations 205 are mounted in the receiving slots 204, respectively. Each of the connection terminations 205 is electrically connected with the mating contact 201 in the body 202. A step portion 207 is formed outside of the upright wall 203. As shown in FIG. 19, each of the connection terminations 205 comprises a pair of connection arms 209 extending from a base 206. A holding portion 210 is formed between the pair of connection arms 209. As shown in FIG. 18, a piercing portion 208 protrudes into the receiving slot 204 formed in the upright wall 203. Before mounting the communication module 200 to an installation device, it needs to stably hold wires 301 of a cable 300 in a holding portion 210 formed between the two connection arms 209 of the connection terminations 205 to electrically connect the wires 301 to the holding portions 210, respectively.

Figure 2:
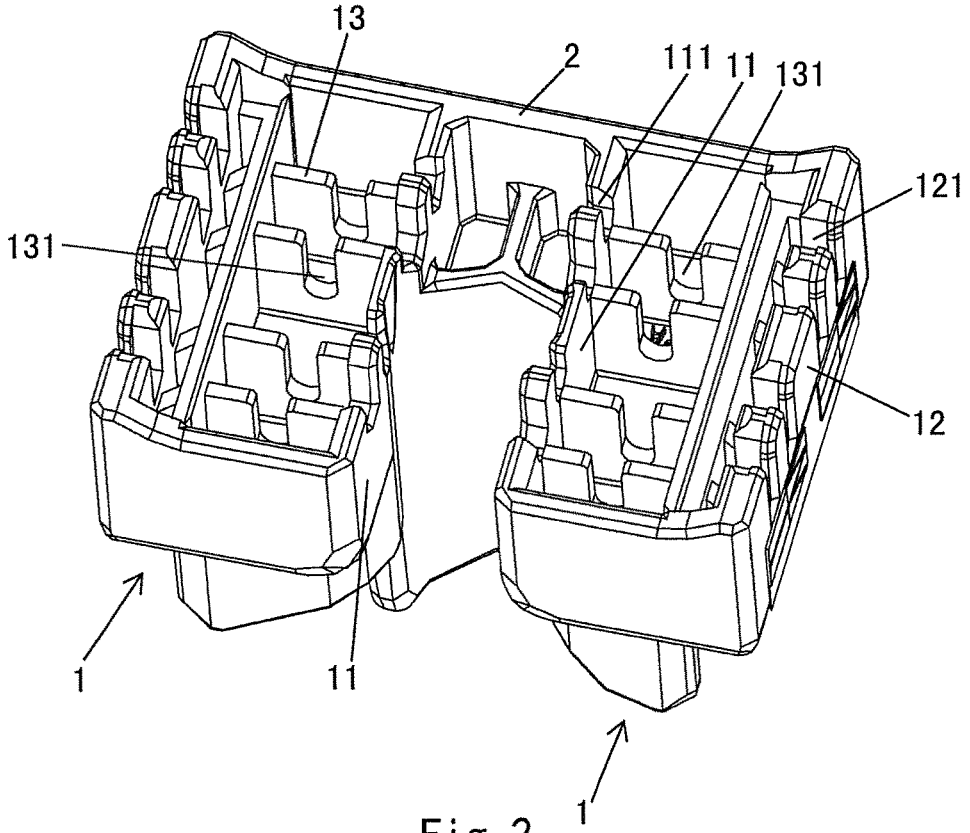
FIG. 2 is another illustrative perspective view of the terminating apparatus of FIG. 1.
Figure 3:
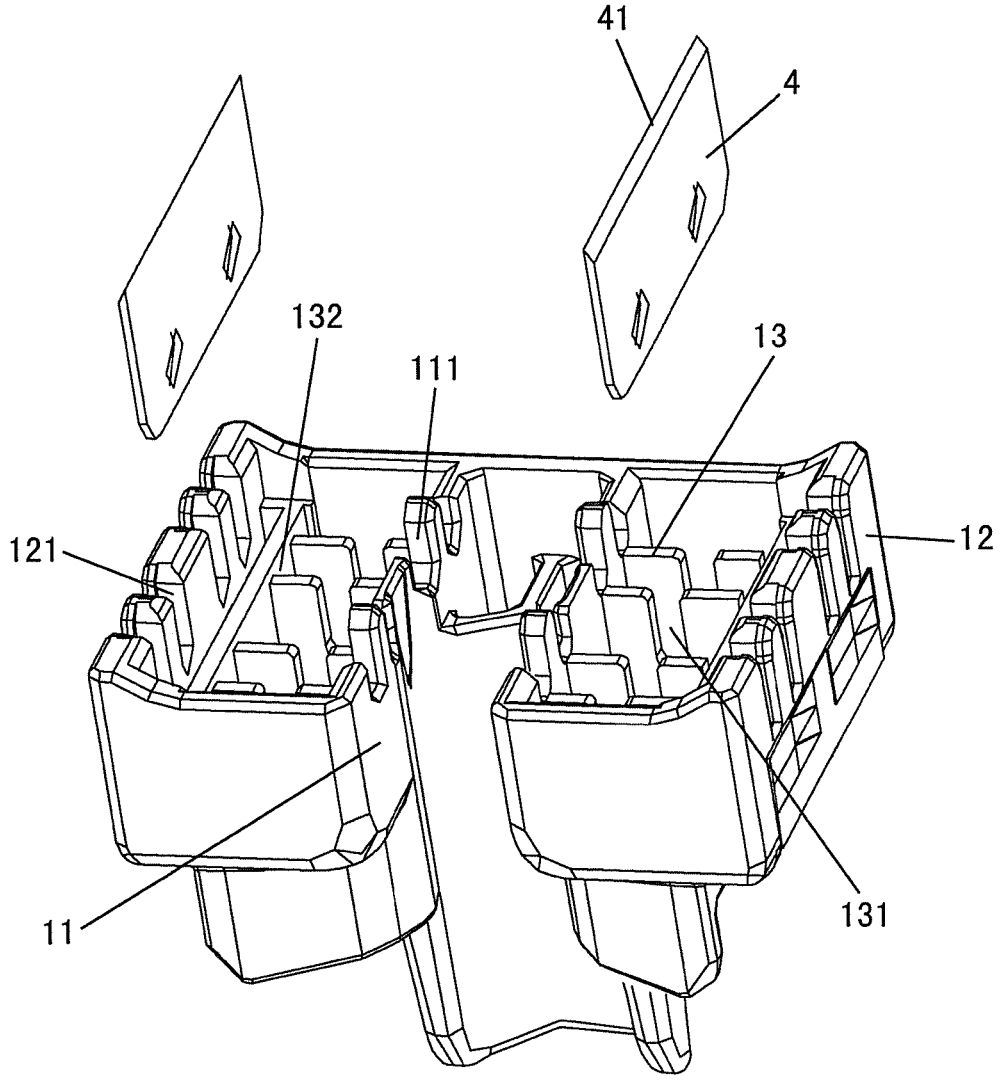
FIG. 3 is an illustrative exploded view of the terminating apparatus of FIG. 1.

In an exemplary embodiment of the present invention, there is provided a terminating apparatus 100 for terminating the plurality of wires 301 of the cable 300 to the plurality of connection terminations 205 of the communication module 200. In the communication module 200, two upright walls 203 are arranged parallel to each other in a longitudinal direction at the rear end of the body 202. Each of the upright walls 203 is provided with the plurality of receiving slot 204 extending in a lateral direction. The connection terminations 205 are mounted in the receiving slots 204, respectively. As shown in FIGS. 1-3, the terminating apparatus 100 comprises two terminating portions 1 and a connection portion 2. The two terminating portions 1 are arranged parallel to each other in a first direction (the longitudinal direction). The two upright walls 203 are adapted to be inserted into the terminating portions 1, respectively. Each of the terminating portions 1 is configured to separately hold the plurality of wires 301, extending in a second direction (the lateral direction) and parallel to each other, of the cable 300. The connection portion 2 is connected between the two terminating portions 1, and the cable 300 is able to be held between the two terminating portions 1.

In an exemplary embodiment, an arc portion 21 extending in a third direction (a height direction) perpendicular to the first and second directions is formed on the connection portion 2, so as to hold the cable 300 extending in the third direction. The terminating apparatus 100 further comprises a cutting apparatus 4 made of metal, such as, stainless steel, copper, etc. The cutting apparatus 4 is provided in the terminating portion 1 in the first direction and configured to cut off end portions of the wires 301 (it will describe later).

In an exemplary embodiment, each of the terminating portions 1 comprises a first support wall 11 connected to the connection portion 2, a second support wall 12 provided parallel to the first support wall 11, and a plurality of separation walls 13 provided between the first support wall 11 and the second support wall 12. The cable 300 is adapted to be held between opposite first support walls 11. Each of the separation walls 13 is adapted to be inserted into the respective receiving slot 204 of the upright wall 203 of the communication module 200. The cutting apparatus 4 is provided between the second support wall 12 and the plurality of separation walls 13. A slit 132 may be formed in a joint of the separation wall 13 to the second support wall 12, and the separation wall 13 is still connected to the second support wall 12 at the bottom of slit 132. The cutting apparatus 4 made of a thin metal sheet is mounted in the slit 132. As shown in FIG. 3, the cutting apparatus 4 comprises a blade 41 extending in the first direction, and the blade 41 of the cutting apparatus 4 exceeds the separation walls 13 in the third direction (the height direction) by a height no less than a diameter of the wire 301. In this way, the cutting apparatus 4 may cut off the wires 301 rested on the separation walls 13 (it will describe later).

Figure 4:
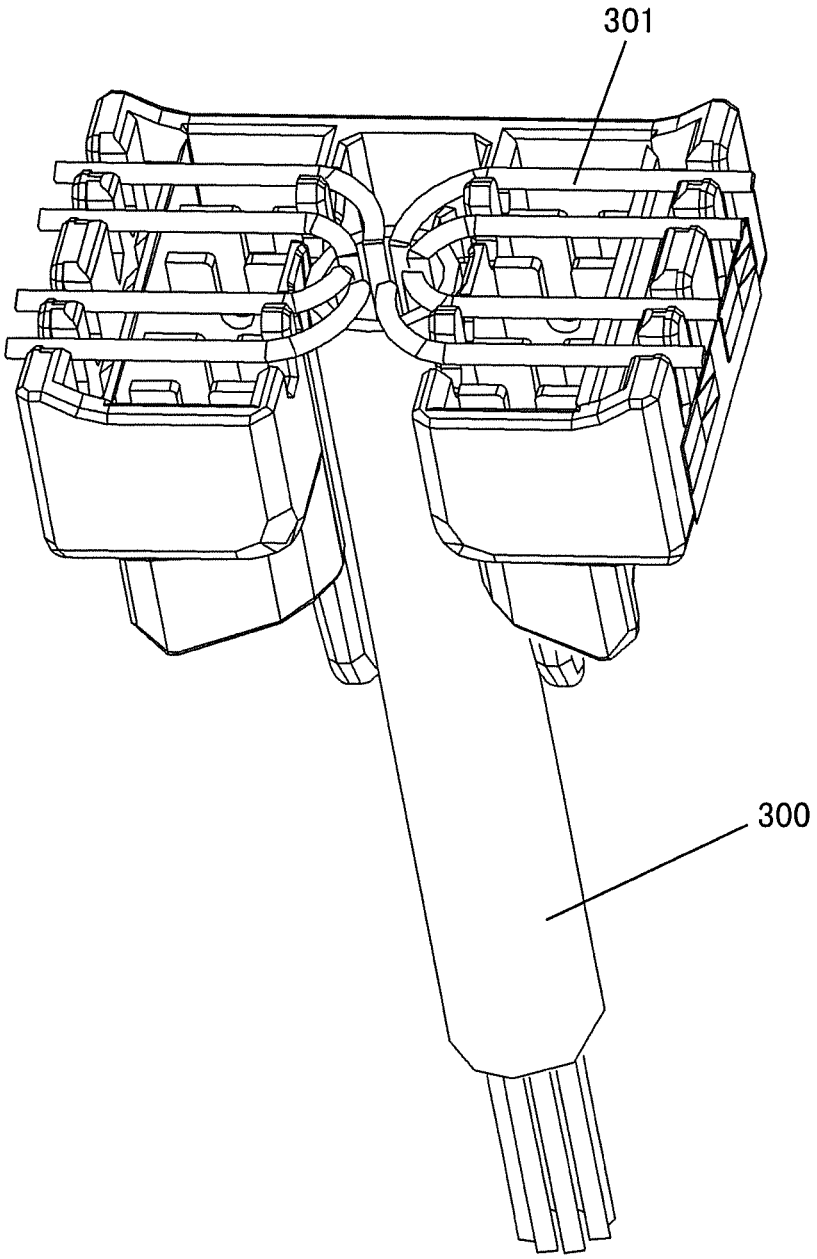
FIG. 4 is an illustrative perspective view of the terminating apparatus of FIG. 1 on which a cable is mounted.

As shown in FIGS. 2-4, a plurality of first holding slots 111 are formed in a first edge of the first support wall 11, each of the first holding slots 111 is aligned with a respective separation wall 13 in the second direction. Similarly, a plurality of second holding slots 121 are formed in a first edge of the second support wall 12, each of the second holding slots 121 is aligned with a respective separation wall 13 in the second direction. With such configuration, the wires 301 held in the first holding slots 111 and the second holding slots 121 may be rested on the separation walls 13. Each of the separation walls 13 is provided with a notch 131 (its function will be described later) between the cutting apparatus 4 and the first support wall 11.

In an exemplary embodiment of the present invention, the terminating portion 1 further comprises a base 14 for supporting the first support wall 11, the second support wall 12 and the separation walls 13. The first support wall 11, the second support wall 12 and the separation walls 13 are integrally formed on a front side of the base 14 facing with the communication module 200. Strengthening ribs 22 are formed on a back side of the base 14, to increase the strength of the entire terminating portion 1. It should be appreciated that all parts of the terminating apparatus 100 may be integrally molded with plastic by molding, and the metal cutting apparatus 4 may be molded in the terminating portion 1 by over molding, or removably fitted in the slit 132 of the terminating portion 1 after forming the terminating portion.

Figure 6:
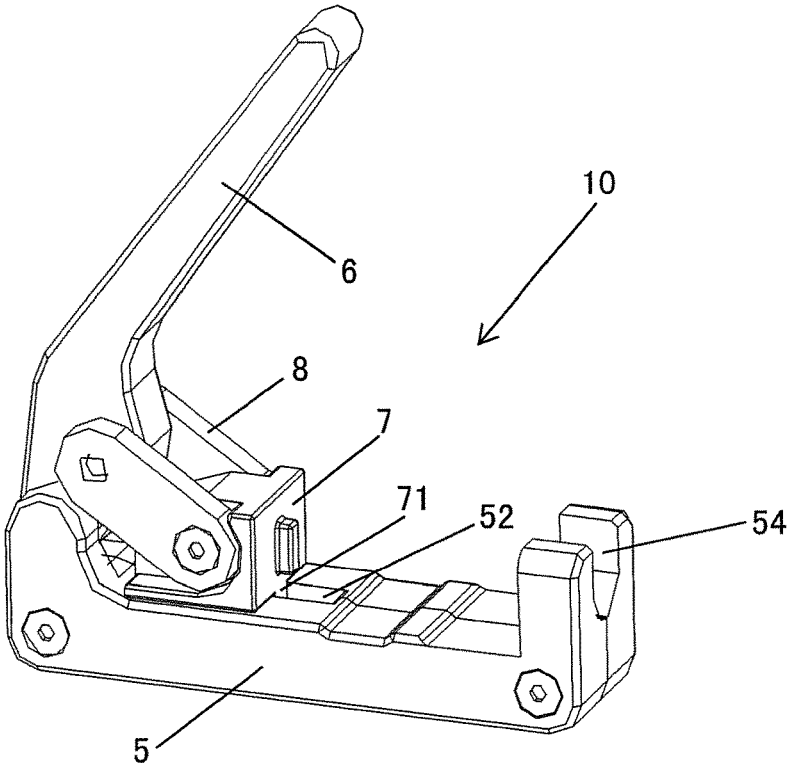
FIG. 6 is an illustrative perspective view of a pressing tool according to an exemplary embodiment of the present invention.
Figure 7:
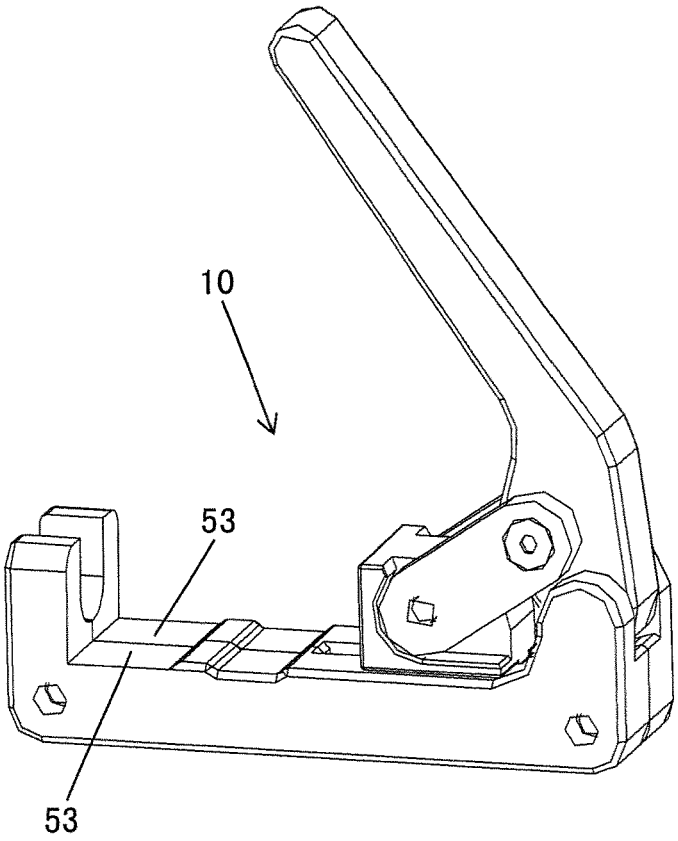
FIG. 7 is another illustrative perspective view of a pressing tool according to the exemplary embodiment of the present invention.
Figure 8:
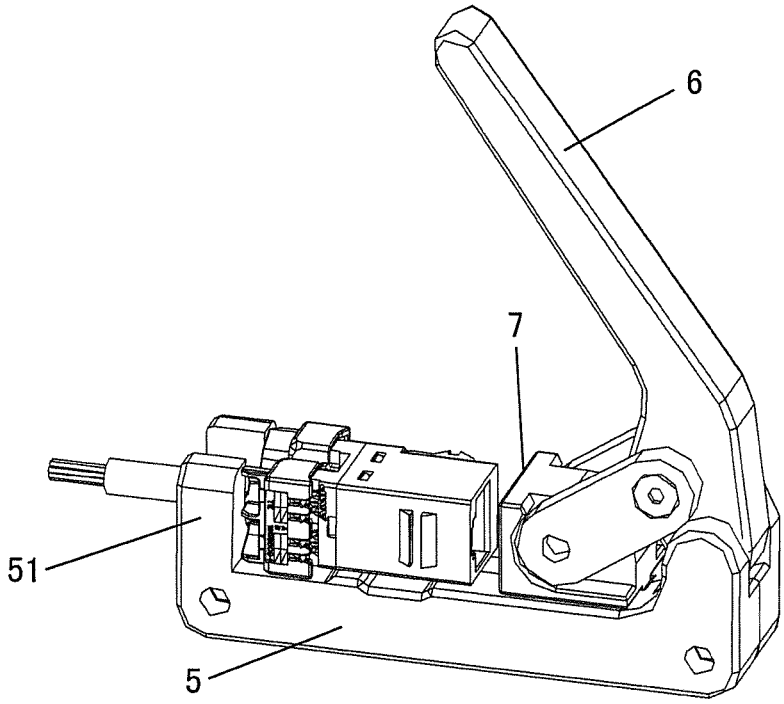
FIG. 8 is an illustrative perspective view of placing the terminating apparatus and the communication module being initially engaged shown in FIG. 5 on the pressing tool shown in FIG. 8.

In an exemplary embodiment of a further aspect of the present invention, there is provided a pressing tool 10 for terminating wires 301 of the cable 100, which are placed in the terminating apparatus 100 according to any one of the above embodiments, to a communication module 200. As shown in FIGS. 6-8, the pressing tool comprises a seat 5 having a blocking portion 51 formed on a first end (left end in FIGS. 6-8) thereof, a handle 6 pivotally mounted on a second end (right end in FIGS. 6-7) of the seat 5 opposite to the first end, a movable block 7, and a link 8. Both ends of the link 8 are pivotally connected to the handle 6 and the movable block 7, respectively, so that the movable block 7 is linearly moved on the seat 5 once the handle 6 is rotated relative to the seat 5.

Figure 9:
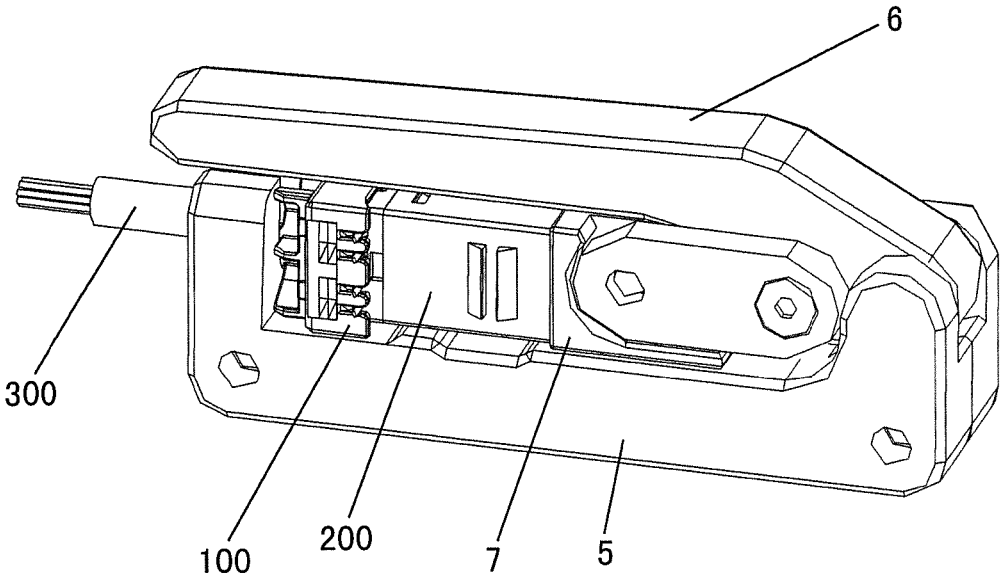
FIG. 9 is an illustrative perspective view of pressing the terminating apparatus and the communication module into a final engagement state.
Figure 10:
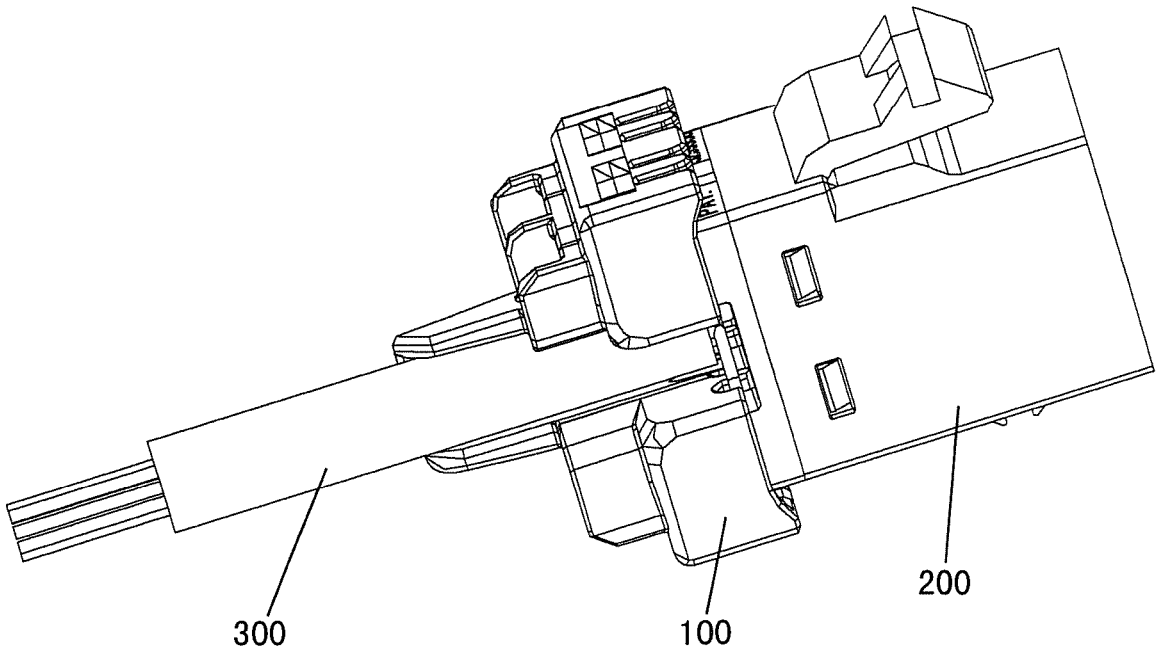
FIG. 10 is an illustrative perspective view of the terminating apparatus and the communication module being in the final engagement state and detached from the pressing tool.

In an exemplary embodiment, the movable block 7 is configured to be moved between an initial position (as shown in FIG. 8) where the terminating apparatus 100 and the communication module 200 preassembled into an initial engagement state are adapted to be placed between the movable block 7 and the blocking portion 51 and a final position (as shown in FIG. 9) where the terminating apparatus 100 and the communication module 200 are adapted to be pressed into a final engagement state, in which the wires 301 are reliably electrically connected to the connection terminations 205, respectively, by moving the movable block 7 relative to the blocking portion 51.

In an exemplary embodiment, the movable block 7 is engaged to the seat 5 via a guide rail mechanism. For example, the movable block 7 is formed with a guide protrusion 71 thereon, and the seat 5 is formed with a guide slot 52 mated with the guide protrusion 71. In this way, the movable block 7 may be stably linearly slid on the seat 5. In an exemplary embodiment, the handle 6 is connected to the seat 5 via a pivotal shaft mechanism, and both ends of the link 8 are connected to the handle 6 and the movable block 7 via pivotal shaft mechanisms, respectively. In this case, the movable block 7 may be linearly moved on the seat 5 once the handle 6 is rotated relative to the seat 5.

The blocking portion 51 is formed with a recess 54 for receiving the arc portion 21 of the terminating apparatus 100, so that the terminating apparatus 100 may be stably placed on the seat 5. In an exemplary embodiment, the seat 5 is formed by assembling two substantially identical half bodies 53. A notch is formed in an inner side of each of the half bodies 53. When the two half bodies 53 are assembled together by a fastener, for example, a bolt, the seat 5 is obtained, and the notches in the half bodies 53 are combined as the guide slot 52.

Figure 5:
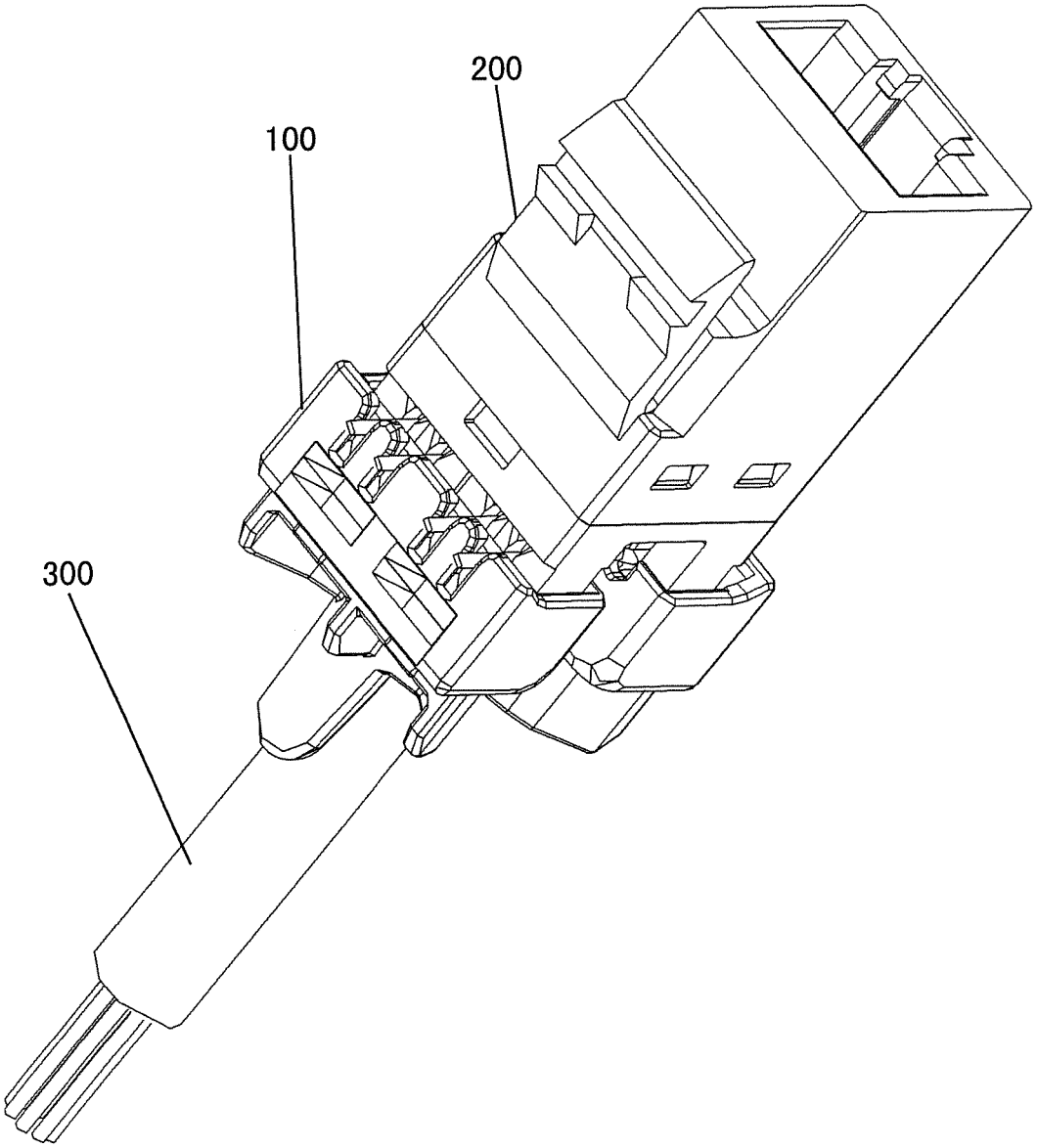
FIG. 5 is an illustrative perspective view of initially engaging the terminating apparatus mounted with the cable to a communication module.
Figure 11:
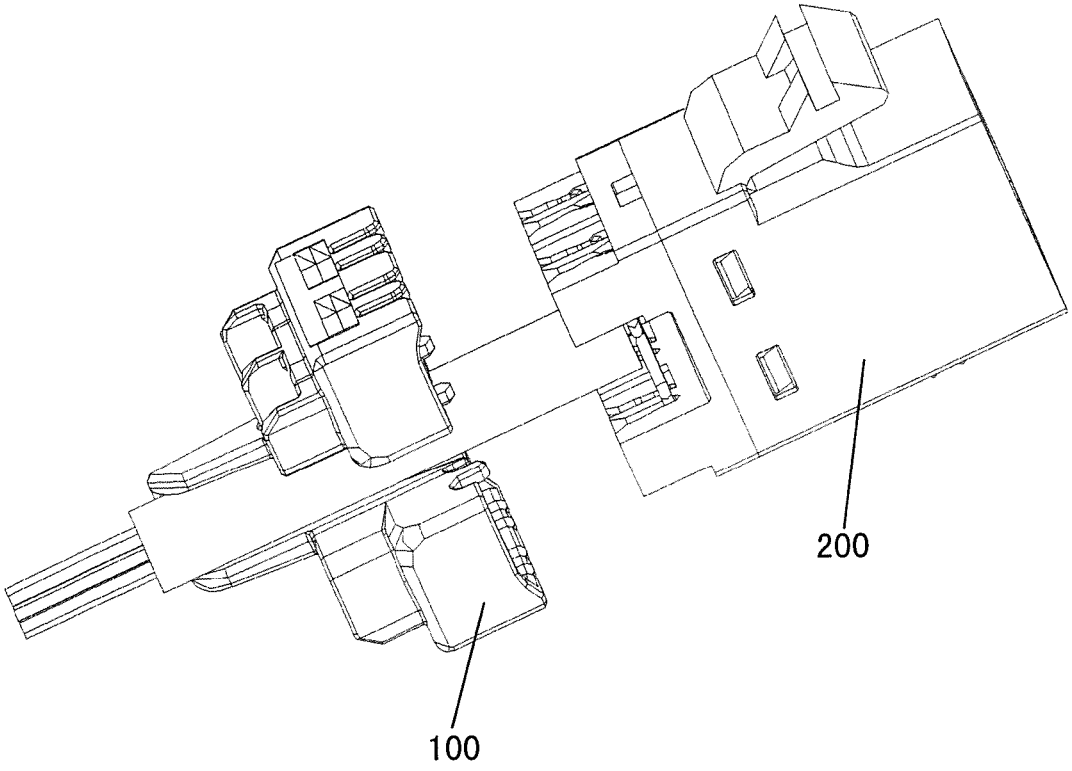
FIG. 11 is an illustrative perspective view of initially removing the terminating apparatus from the communication module.
Figure 12:
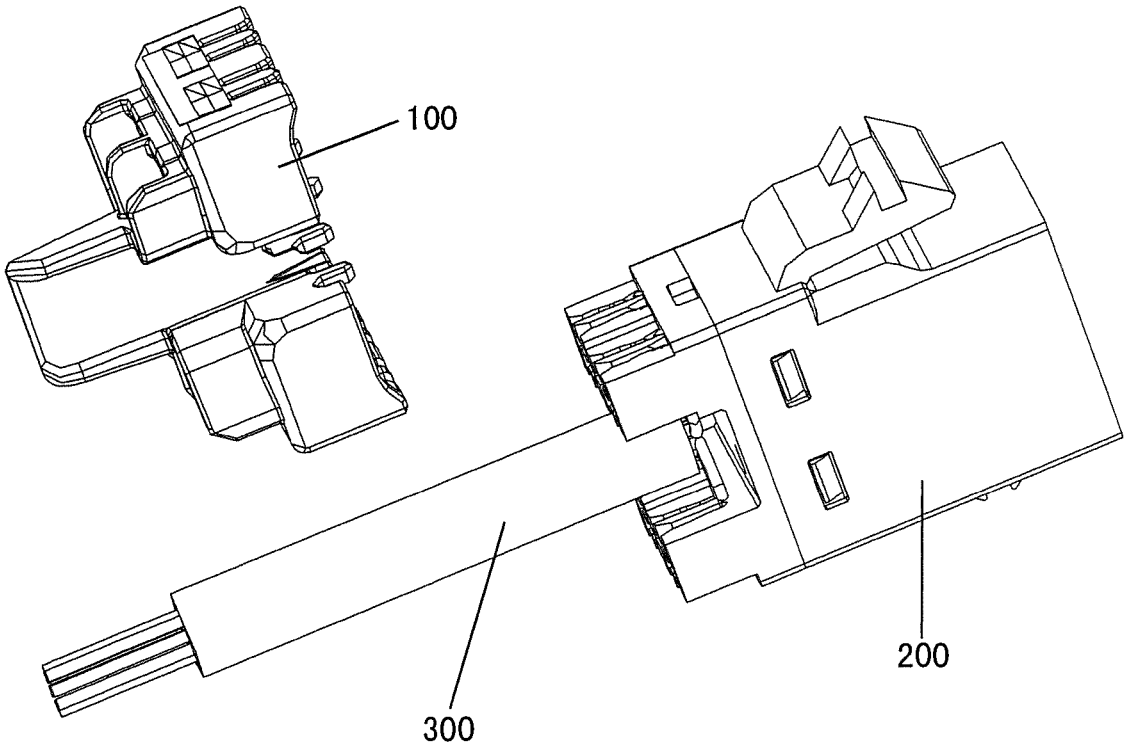
FIG. 12 is an illustrative perspective view of further removing the terminating apparatus from the communication module.
Figure 13:
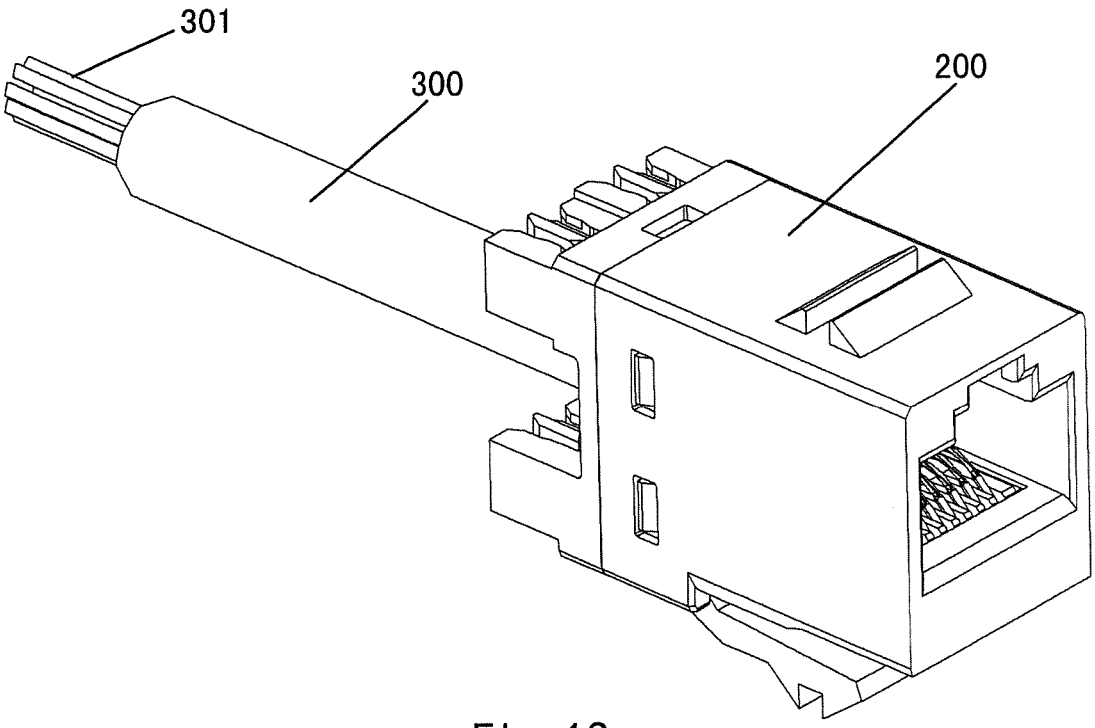
FIG. 13 is an illustrative perspective view of a communication module (a typical communication module) on which a cable is connected.
Figure 14:
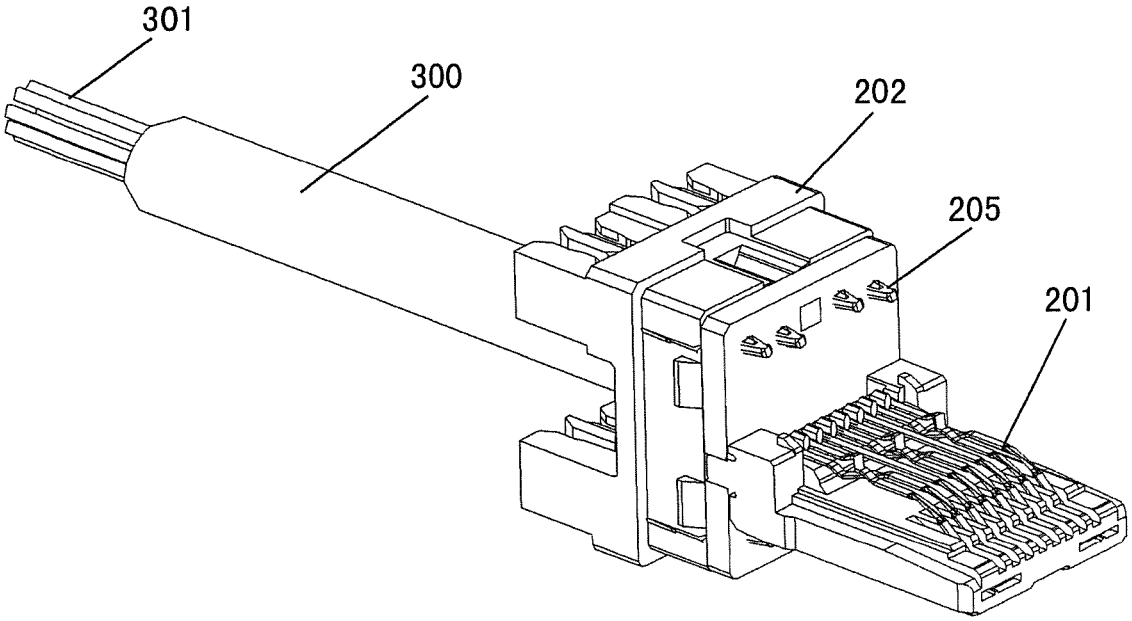
FIG. 14 is an illustrative perspective view of the communication module of FIG. 13 after a housing is removed.

In an exemplary embodiment of the present invention, there is provided a method for the terminating wires 301 of the cable 300 to the communication module 200 with the terminating apparatus 100 according to any one of the above embodiments and the pressing tool 10 according to any one of the above embodiments. The method may comprise steps of:

S100: removing an external sheath from an end of a cable 300 by a stripping tool, to expose a plurality of wires 301;

S200: as shown in FIG. 4, passing the cable 300 through between the pair of terminating portions 1 in the third direction (height direction), and holding the plurality of wires 301 on the terminating portions 1 in parallel to each other in the second direction (lateral direction);

S300: as shown in FIG. 5, initially engaging the communication module 200 to the terminating apparatus 100, so that the upright wall 203 of the communication module 200 partly inserted into the terminating portion 1 of the terminating apparatus 100, and the wires 301 are located outside the piercing portions 208 of the connection terminations 205 (upside the piercing portions 208 in FIG. 19), respectively;

S400: as shown in FIG. 8, opening the handle 6 of the pressing tool 10, and placing the terminating apparatus 100 and the communication module 200 being in an initial engagement state between the movable block 7 and the blocking portion 51 on the pressing tool 10;

S500: pressing the handle 6, so that the movable block 7 is moved toward the blocking portion 51, the respective wire 301 is driven by the respective separation wall 13 of the terminating apparatus 100 to move toward the piercing portion 208 of the respective connection termination 205, and the piercing portion 208 pierces an external protection layer of the respective wire 301;

S600: as shown in FIG. 9, continuing pressing the handle 6 until a conductor of the pierced wire 301 is moved into and electrically contacts the holding portion 210 of the respective connection termination 205 under driving of the respective separation wall 13 of the terminating apparatus 100;

S700: opening the handle 6, and taking the terminating apparatus 100 and the communication module 200 being in the final engagement state away from the pressing tool 10; and S800: as shown in FIGS. 11-12, removing the terminating apparatus 100 from the communication module 200.

After the terminating apparatus 100 is removed from the communication module 200, the conductors of the wires 301 held in the holding portions 210 of the connection terminations 205 are still electrically connected to the connection terminations 205. As a result, the communication module 200 terminated with the cable, as shown in FIGS. 13-16, is obtained.

In an exemplary embodiment, with the elastic connection arms 209, a holding force exerted on the wire 301 by the holding portion 210 of the connection termination 205 is larger than a holding force exerted on the wire 301 by the first holding slot 111 of the first support wall 11 (see FIGS. 2 and 4). Consequently, in the step S800, after the terminating apparatus 100 is removed from the communication module 200, the wires 301 are still held in the holding portions 210 of the connection terminations 205, but separated from the first holding slots 111 of the terminating apparatus 100. In an exemplary embodiment, as shown in FIGS. 1-4, an opening is formed between the two terminating portions 1 and opened in the longitudinal direction, so that the terminating apparatus 100 may be removed from the cable 300 through the opening, as shown in FIG. 11.

In the above method of terminating the wires to the communication module, in the step S200, as shown in FIGS. 2-4 and 15, the wires 301 are pressed into the first holding slots 111 of the first support wall 11 and the second holding slots 121 of the second support wall 12, rested on the separation walls 13, and cross over the cutting apparatus 4. In this way, during pressing the terminating apparatus 100 toward the communication module 200 by the movable block 7, the upright wall 203 of the communication module 200 is partly received between the cutting apparatus 4 and the first support wall 11, that is, the cutting apparatus 4 is located outside the upright wall 203. With the terminating apparatus 100 moving toward the communication module 200, the wire 301 is pressed against the separation wall 13, and the separation wall 13 drive the wire 301 to move into the receiving slot 204 of the upright wall 203 of the communication module 200 in the height direction. During the wire 301 is driven to move by the separation wall 13, the wire 301 firstly contacts the piercing portion 208 between two connection arms 209 of the connection termination 205, and then the sharp blade of the piercing portion 208 pierces the external protection layer of the wire 301.

During piercing the wire 301, the wire 301 is pressed by the piercing portion 208 and is bent toward the notch 131 formed in the separation wall 13. In this way, it may prevent the wire 301 form being cut off by the piercing portion 208. As a result, the terminating apparatus 100 and the communication module 200 are pressed into the final engagement state (see FIG. 17).

In the step S600, the terminating apparatus 100 continue moving toward the communication module 200, and the separation walls 13 of the terminating apparatus 100 continue drive the pierced wire 301 into the holding portion 210 between the two connection arms 209 of the connection termination 205. When the cutting apparatus 4 of the terminating apparatus 100 is about to reach the step portion 207 located outside the upright wall 203 of the communication module 200, the blade of the cutting apparatus 4 cut off the end portion of the wire 301 which extends out the receiving slot 204 of the communication module 200 in the second direction.

In an exemplary embodiment, in the step S400, the arc portion 21 of the terminating apparatus 100 is received in the recess 54 of the blocking portion 51, so as to stably hold the terminating apparatus 100 and the communication module 200 on the seat 5.

In the terminating apparatus, the pressing tool, the tool kit as well as the method for terminating wires to a communication module according to the above various exemplary embodiments, terminating the wires of the cable to the communication module may be performed by a single simple operation. The communication module may be easily and quickly mounted to or removed from the terminating apparatus, saving the operation time and increasing the work efficiency. In addition, a special cutting tool for peeling off the external protection layers of the wires before terminating the wires is not necessary in the present invention, saving the cost. Furthermore, the wires of the cable may be reliably and stably terminated to the communication module, improving the reliability of the network wiring.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A terminating apparatus for respectively terminating a plurality of wires of a [fiber optic] cable to a plurality of connection terminations of a communication module, the communication module comprising a pair of upright walls, the pair of upright walls respectively defining receiving slots, the plurality of connection terminations being respectively mounted in the receiving slots, the plurality of connection terminations being electrically connected with a respective one of the plurality of wires, the terminating apparatus comprising:

a pair of terminating portions into which the pair of upright walls of the communication module are adapted to be inserted, the pair of terminating portions being constructed to separately hold the plurality of wires of the [fiber optic] cable, the pair of upright walls being arranged parallel to each other in a first direction, *a second direction being perpendicular to the first direction,* the pair of terminating portions each having first and second support walls, *wherein the terminating apparatus defines an opening formed between the pair of terminating portions and opened in the first direction, so that the terminating apparatus may be removed from the cable through the opening*;

a connection portion connected to the first and second support walls of the pair of terminating portions such that the connection portion is positioned between the pair of terminating portions; and

[a tail] *an arc portion* formed on the connection portion, the [tail] *arc portion* extending in a third direction perpendicular to the first and second directions, wherein the [tail] *arc portion* includes a slotted open side *aligned with the opening and* adapted to wrap around a portion of the [fiber optic] cable to hold the [fiber optic] cable steady while extended in the third direction.

2. The terminating apparatus according to claim 1, wherein the plurality of wires extend parallel to each other in the second direction.

[3. The terminating apparatus according to claim 1, wherein the tail includes an arc portion.]

4. The terminating apparatus according to claim 1, wherein each of the terminating portions comprises:

a plurality of separation walls provided between the first support wall and the second support wall of each of the pair of terminating portions, the second support wall being parallel to the first support wall;

wherein the [fiber optic] cable is adapted to be held between opposite first support walls;

wherein each of the plurality of separation walls is adapted to be inserted into the respective receiving slot of the pair of upright walls; and wherein at least one cutting apparatus is provided between the second support wall and the plurality of separation walls.

5. The terminating apparatus according to claim 4, wherein a plurality of first holding slots are formed in a first edge of each first support wall, and each of the first holding slots is aligned with a respective separation wall in the second direction.

6. The terminating apparatus according to claim 5, wherein a plurality of second holding slots are formed in a first edge of each second support wall, and each of the second holding slots is aligned with a respective separation wall in the second direction.

7. The terminating apparatus according to claim 4, wherein each of the plurality of separation walls is provided with a notch between the at least one cutting apparatus and the first support walls.

8. The terminating apparatus according to claim 4, wherein the at least one cutting apparatus comprises a blade extending in the first direction, and wherein the blade of the at least one cutting apparatus exceeds the plurality of separation walls in the third direction by a height no less than a diameter of a respective one of the plurality of wires.

9. The terminating apparatus according to claim 4, wherein the pair of terminating portions further comprise a base for supporting the first support walls, the second support walls, and the plurality of separation walls.

10. The terminating apparatus according to claim 1, wherein the receiving slots are formed in the pair of upright walls in [a] *the* second direction [perpendicular to the first direction].

* * * * *